Patented Nov. 30, 1943

2,335,374

UNITED STATES PATENT OFFICE 2,335,374

MANUFACTURE OF HIGH-DENSITY PERICLASE

Teynham Woodward, Los Altos, Calif., assignor to Westvaco Chlorine Products Corporation, New York, N. Y., a corporation of Delaware No Drawing. Application January 31, 1941, Serial No. 376,937

5 Claims. (Cl. 23—201)

This invention or discovery relates to the manufacture of high-density periclase; and it comprises a method of making periclase in the form of compact relatively non-porous granules, well suited for refractory manufacture, in which hydrated magnesia is precipitated under conditions producing porous aggregates of low apparent density, and these aggregates are milled wet to increase the apparent density and are dried and fired to remove H₂O; all as more fully hereinafter set forth and as claimed.

Periclase (MgO) is employed in making certain types of refractories. For best results it should be in granular form of high density in bulk. In the best method now known for producing periclase for this purpose, as the first step hydrated magnesia is precipitated from magnesium chloride brines with the aid of finely divided quicklime under controlled conditions. The precipitate is then filtered, washed, dried and fired in a kiln to drive off free and combined moisture. In kilning, the material is fed to the upper end of an inclined rotary kiln fired by an internal flame and is exposed to progressively increasing temperatures, up to about 1600 or 1800° C. as it moves downward. It issues from the kiln as periclase.

Precipitated magnesia produced by this method has a somewhat granular form, as distinguished from the colloidal particles of milk of magnesia preparations made with milk of lime, and can be filtered fairly readily. While this form of magnesia seems amorphous by macroscopic tests, X-ray and microscopic tests make it apparent that the granules are predominantly masses of microcrystalline nuclei with interlocking whiskers, so to speak. The granules exhibit very low density in bulk. However, a substantial part of the product occurs in the form of granules or lumps of substantial size; a size of 20-mesh, for example. To the extent that the precipitate is in the latter form the product has a substantial advantage over precipitates of the milk of magnesia type in that the granules settle faster and permit faster filtration, besides giving, on firing, a periclase of higher apparent density.

The drying of a filter cake of this spongy type to an extent such that the water content corresponds to the hydroxide (Mg(OH)₂) is associated with only very slight shrinkage; the cake, free of uncombined moisture, contains a large proportion of air space. Further heating in the kiln causes some disintegration but the product retains most of its bulk at least until the MgO stage is reached, at a temperature of about 400° to 500° C. Continued calcination as the material is exposed to higher temperatures in the kiln causes some shrinkage and increase in density. The periclase leaving the kiln is of moderately high density. Nevertheless it is still not suitable for certain refractories unless the firing time is made very long, with attendant high fuel costs.

An object achieved in the present invention is the preparation of a periclase in the form of compact granules of low porosity and high density in bulk, eminently suited for refractory manufacture.

The invention is based on the discovery that by milling a filter cake of spongy, hydrated magnesia particles before the drying and calcining steps, the density of the periclase ultimately obtained is increased. The reduction in porosity is often of the order of 10 per cent. To secure a periclase of the same high density without this step requires an enormously increased fuel expenditure at the kiln.

According to the present invention, hydrated magnesia is precipitated from a magnesian brine by one of the ordinary methods, advantageously (though not necessarily) using quicklime for the sake of securing an easy filtering precipitate, and the wet precipitate is washed and then subjected to treatment in a hammer mill or other device which will break down the spongy crystal aggregates. There is some diminution of the particle size and this is not objectionable. The product of the milling step is a somewhat clayey slurry. It is introduced into a rotary kiln and fired in the usual way. A relatively moderate temperature suffices to drive off all the water and yield a periclase of good quality. It is easy in this way to secure a product leaving a porosity of 15 per cent or less; that is to say, the individual granules have only 15 per cent of their volume as voids.

Porosity is determined by measuring the volume of a weighed mass of granules by liquid displacement under conditions such that the displacing liquid does not enter the pores of individual granules (as by sealing the pores or using mercury as the liquid). To determine porosity, the density (weight divided by volume) is compared with the density of a body of the same material (determined by a similar displacement method) pulverized so fine that the individual particles are substantially solid and poreless. The density of the product of the present invention in typical embodiments is around 3.0 as compared with the density of 3.5 of magnesia in mass as determined by the latter method; the porosity being around 15 per cent. Porosities of 10 per cent or less are readily obtained.

Because of the breaking up of spongy structure and decrease in particle size, it is usually desirable to perform the milling after filtering, so as to take advantage of the easy filtering qualities of the fresh low density precipitate. However, milling can be done before filtering. This increases the filtering cost somewhat but results in a drier cake (less water).

The effect of the milling step is to reduce the spongy magnesia cake to a form best adapted to yield dense periclase on firing. It is useful with magnesia precipitates produced in other ways than by the quicklime precipitation method. Thus milk of lime and dolomitic limes, either quick or hydrated, can be employed as precipitants.

The brine from which the magnesia is precipitated is usually a relatively strong magnesium chloride bittern, such as is obtained from seawater after partial evaporation, and removal of sulfate. Such a brine or bittern is essentially an aqueous solution of sodium, calcium and magnesium chlorides. Seawater itself can be used as raw material, and so can magnesian brines of other origin. The term brine as employed herein includes all such magnesian liquors from which magnesia can be precipitated as described.

In a specific example illustrative of one good mode of practicing the invention, a warm, magnesium chloride bittern from seawater, substantially free of sufate and of foreign matters, was treated under mild agitation with freshly ground quicklime of particle size less than 20-mesh and mostly greater than 100-mesh. A hydrated magnesian precipitate formed. The reaction mixture was thickened, washed, and filtered in a filter press. The precipitate was washed.

The wet cake was sent through a hammer mill where it was subjected to milling. The cake broke down into a uniform finely divided wet mass of clayey appearance. A time of dwell in the mill of a fraction of a second is enough. The milled cake was introduced into a rotary kiln of usual type, heated by an internal flame from the lower end. Elimination of $H_2O$, free and combined, took place, together with shrinkage. The material leaving the kiln had particles of substantially lower porosity than when the milling step is omitted.

In preparing the magnesium hydroxide, use of quicklime as the precipitant as described is advantageous mostly for the sake of producing an easy filtering product. But as stated other methods of producing the hydrated magnesia can be employed while achieving comparable results.

The invention can be practiced with the object either of producing a denser product than is possible in conventional procedures, or for producing a product of the same density at materially reduced kiln fuel cost.

In the milling step a hammer mill is especially convenient but ball mills, rod mills and other types of mills also having an impact beating action can be employed with comparable results.

In speaking of per cent reduction in porosity, a 10 per cent reduction for example refers to a change from 30 to 20 per cent void volume, or from 25 to 15 per cent void volume, etc.

What I claim is:

1. In methods of making high density periclase wherein hydrated magnesia is precipitated from magnesian brines under conditions such that the precipitated magnesia is in the form of a granular spongy mass of aggregated particles, exhibiting a relatively low apparent density in mass, and the magnesia is fired at a relatively high temperature and for such time as to drive off combined $H_2O$ and cause shrinkage of the magnesia, whereby to produce periclase; the improvement which comprises subjecting the precipitate, prior to firing it, to a milling action in a mill having an impact beating action, said milling being sufficient to increase the apparent density thereof; so that the periclase produced has, for given firing conditions, relatively increased apparent density and relatively lowered porosity compared with the same magnesia fired without prior milling.

2. In methods of making high density periclase wherein hydrated magnesia is precipitated from magnesium chloride brines with the aid of lime under conditions such that the precipitated magnesia is in the form of a granular spongy mass of aggregated particles, exhibiting a relatively low apparent density in mass, and the magnesia is filtered and is fired at a relatively high temperature and for such time as to drive off combined $H_2O$ and cause shrinkage of the magnesia, whereby to produce periclase, the improvement which comprises subjecting the precipitate, prior to firing it, to a milling action in a mill having an impact beating action, said milling being sufficient to compact the precipitate and increase the apparent density thereof, so that the periclase produced has, for given firing conditions, relatively increased apparent density and relatively lowered porosity compared with the same magnesia fired without prior milling.

3. In methods of making high density periclase wherein hydrated magnesia is precipitated from magnesian brines under conditions such that the precipitated magnesia is in the form of a granular spongy porous mass of aggregated particles, exhibiting a low apparent density in mass, and the precipitated magnesia is filtered and is fired at a relatively high temperature and for such time as to drive off combined $H_2O$ and cause shrinkage of the magnesia whereby to produce periclase, the improvement which comprises subjecting the precipitate, after it is filtered and before it is fired, to a milling action in a mill having an impact beating action, said milling being sufficient to break down the spongy structure and increase the apparent density of the mass; so that the periclase produced has, for given firing conditions, relatively increased apparent density and relatively lowered porosity compared with the same magnesia fired without prior milling.

4. In methods of making high density periclase wherein hydrated magnesia is precipitated from magnesian brines under conditions such that the precipitated magnesia is in the form of a granular spongy porous mass of aggregated particles, exhibiting a low apparent density in mass, and the precipitated magnesia is filtered and is fired at a relatively high temperature and for such time as to drive off combined $H_2O$ and cause shrinkage of the magnesia whereby to produce periclase, the improvement which comprises subjecting the precipitate, before it is filtered, to a milling action in a mill having an impact beating action, said milling being sufficient to break down the spongy structure and increase the apparent density of the mass; so that the periclase produced has, for given firing conditions, relatively increased apparent density and relatively lowered porosity compared with the same magnesia fired without prior milling.

5. The method of making periclase from porous, spongy hydrated magnesia precipitates, which comprises milling the precipitate in a mill having an impact beating action until the spongy structure is broken down and the precipitate is converted into a fine-grained material of increased apparent density, and firing the so milled material at such temperature and for such time as to convert it to periclase having low porosity and high density in bulk.

TEYNHAM WOODWARD.